United States Patent
Young et al.

(10) Patent No.: US 7,203,209 B2
(45) Date of Patent: Apr. 10, 2007

(54) SYSTEM AND METHOD FOR A PASSIVELY Q-SWITCHED, RESONANTLY PUMPED, ERBIUM-DOPED CRYSTALLINE LASER

(75) Inventors: York E. Young, Amherst, NH (US); Scott D. Setzler, Manchester, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 227 days.

(21) Appl. No.: 11/040,758

(22) Filed: Jan. 19, 2005

(65) Prior Publication Data

US 2006/0159132 A1 Jul. 20, 2006

(51) Int. Cl.
*H01S 3/11* (2006.01)
*H01S 3/113* (2006.01)

(52) U.S. Cl. .......................................... 372/11; 372/10
(58) Field of Classification Search ............. 372/10–11
See application file for complete search history.

(56) References Cited

U.S. PATENT DOCUMENTS

| | | | | |
|---|---|---|---|---|
| 5,394,413 | A | | 2/1995 | Zayhowski ................. 372/10 |
| 5,802,083 | A | * | 9/1998 | Birnbaum ................... 372/11 |
| 5,832,008 | A | * | 11/1998 | Birnbaum et al. ............ 372/11 |
| 5,933,444 | A | * | 8/1999 | Molva et al. ................ 372/75 |
| 5,982,802 | A | * | 11/1999 | Thony et al. ................ 372/75 |
| 6,023,479 | A | * | 2/2000 | Thony et al. ................ 372/11 |
| 6,101,201 | A | * | 8/2000 | Hargis et al. ................ 372/36 |
| 6,373,864 | B1 | | 4/2002 | Georges et al. ............. 372/10 |
| 6,538,298 | B1 | * | 3/2003 | Weingarten et al. ........ 257/436 |
| 6,778,563 | B2 | * | 8/2004 | Laurell et al. ................ 372/11 |
| 6,813,302 | B1 | | 11/2004 | Stoneman et al. ............ 372/75 |
| 6,826,219 | B2 | * | 11/2004 | Weingarten et al. ...... 372/49.01 |
| 2001/0001005 | A1 | * | 5/2001 | Jiang et al. .................. 372/99 |
| 2003/0031215 | A1 | * | 2/2003 | Kane et al. .................. 372/10 |

OTHER PUBLICATIONS

Fluck, et al., "Eyesafe pulsed microchip laser using semiconductor saturable absorber mirrors", Applied Physics Letters, vol. 72 No. 25, Jun. 22, 1008, pp. 3273-3275.

Kir'yanov, et al., "CW-pumped low-threshold Erbium fiber laser passibely Q switched with CO2+:ZnSe", Advanced Solid-State Lasers, vol. 50, 2001 Optical Society of America, pp. 365-371.

Zolotovskaya, et al., "Passive Q-switching of diode pumped Er:glass laser with V3+:YAG saturable absorber", Advanced Solid-State Photonics, vol. 94, 2004 Optical Society of America, pp. 471-475.

(Continued)

*Primary Examiner*—Minsun Oh Harvey
*Assistant Examiner*—Phillip Nguyen
(74) *Attorney, Agent, or Firm*—Hayes Soloway, PC (57) ABSTRACT

The laser includes a resonant cavity formed between a first mirror and a second mirror. An unsensitized Erbium-doped crystal gain medium for producing laser gain is disposed within the resonant cavity. A saturable absorber is disposed within the resonant cavity. A pump source is positioned to energize the gain medium. The saturable absorber, the laser gain, the resonator length, and the second mirror being selected so that output pulses having a duration of less than 75 nanoseconds are generated by the laser.

17 Claims, 5 Drawing Sheets

OTHER PUBLICATIONS

Denker, et al., "Efficient Satuable Absorber for 1.54 um Er Glass Lasers", Advanced Solid-State Lasers, vol. 26, 1999 Optical Society of America, pp. 618-621.

Mikhailov, et al, "Passive Q-switch performance at 1.3 um (1.5 um) and nonlinear spectroscopy of $Co2+:MgAl2O4$ and $Co2+:LaMgAl11Ol9$ crystals" Advanced Solid-State Lasers, vol. 26, 1999 Optical Society of America, pp. 317-325.

Beach, Raymond J., "CW Theory of quasi-three level end-pumped laser ocsillators", Optics Communications 123 (1995) pp. 385-393.

Stultz, et al, "Divalent Uranium and Cobalt Saturable Absorber Q-switches at 1.5 um", Proceedings on Advanced Solid-State Lasers vol. 24, 1995 Optical Society of America, pp. 460-464.

Wu, et al., "Spectral Bleaching and 1535 nm Q-switching of Uranium Glass", Proceeding on Advanced Solid-State Lasers, vol. 24, 1995 Optical Society of America, pp. 440-444.

Degnan, John J., "Optimization of Passively Q-Switched Lasers", IEEE Journal of Quantum Electronics, vol. 31, No. 11, Nov. 1995, pp. 1890-1901.

Deloach, et al., "Transition Metal-doped Zinc Chalcogenides: Spectroscopy and Laser Demonstration of a New Class of Gain Media", IEEE Journal of Quantum Electronics, vol. 32, No. 6, Jun. 1996, pp. 885-895.

Hamlin, et al., "Eyesafe Erbium Glass Microlaser", Proc. of SPIE, vol. 5332 (2004), pp. 97-102.

Karllson, et al., "Diode-pumped Er-Yb:glass laser passively ! switched by use of $Co2+:MgAl2O4$ as a saturable absorber", Applied Optics, vol. 39, No. 33. (Nov. 20, 2000, pp. 6188-6192.

Lai et al., "Two-frequency Er-Yb:glass microchip laser passively Q switched by a Co:ASL saturable absorber", Optics Letters, vol. 28, No. 5, Mar. 1, 2003, pp. 328-330.

Laroche, et al., "Compact diode-pumped passively Q-switched tunable Er-Yb double-clad fiber laser", Optics Letters, vol. 27, No. 22, Nov. 15, 2002, pp. 1980-1982.

Malyarevich, et al., "Cobalt-doped transparent glass ceramic as a saturable absorber Q switch for erblum:glass lasers", Applied Optics, vol. 40, No. 24, Aug. 20, 2001, pp. 4322-4325.

Patel, et al., "New Formalism for the Analysis of Passively Q-switched Laser Systems", IEEE Journal of Quantum Electronics, vol. 37, No. 5, May 2001, pp. 707-715.

Podlipensky, et al., "$Cr2+:ZnSe$ and $Co2+:ZnSe$ saturable-absorber Q switches for 1.54-um Er:glass lasers", Optics Letters, vol. 24, No. 14, Jul. 15, 1999, pp. 960-962.

Prasad, et al., "Passively q-switched, eyesafe, Yb:Er:glass laser", Proc. of SPIE, vol. 5332 (2004) pp. 103-110.

Xiao, et al., "Additional Experimental Confirmation of the Predictions of a Model to Optimize Passively Q-Switched Lasers", IEEE Journal of Quantum Electronics, vol. 34, No. 7, Jul. 1998, pp. 1142-1143.

* cited by examiner

SYSTEM AND METHOD FOR A PASSIVELY Q-SWITCHED, RESONANTLY PUMPED, ERBIUM-DOPED CRYSTALLINE LASER

FIELD OF THE INVENTION

The present invention relates to the field of lasers and, more specifically, passively Q-switched, eye safe lasers.

BACKGROUND OF THE INVENTION

The need for short pulse (approximately <75 nanoseconds (ns)), high peak power (approximately 10 Kilowatt (kW)), eyesafe (approximately 1.4–1.7 micrometers (microns)) lasers has arisen in both military and commercial arenas. Scanning light detecting and ranging (LADAR) and target identification are examples of military applications needing such lasers, with free space communications likely the largest relevant commercial application.

Traditionally, sources for high peak power, eyesafe wavelength lasers have been wavelength-shifted Neodymium (Nd)-pumped wavelength shifters or Ytterbium (Yb)-sensitized Erbium (Er) lasers. The former has been successfully demonstrated with Nd-pumped Raman converters or optical parametric oscillators (OPOs) (with or without optical parametric amplifiers (OPAs)) but implementation has proven to be complex and costly. The latter has been the traditional approach for high peak power, eyesafe pulse generation at low to moderate (approximately 3 to 1000 Hertz (Hz)) pulse repetition frequencies (PRFs), but several problems in Yb-sensitized Er glass lasers limit gain needed to efficiently produce high peak power pulses at PRFs much greater than 1 kilohertz (kHz). These are: 1) Sufficient pump absorption requires roughly 10% Yb and hence 1% Er concentrations, bringing about Er upconversion which depopulates the upper lasing level, reducing gain and generating waste heat. 2) The energy transfer mechanism from Yb to Er represents an energy extraction bottleneck, since upon opening of a Q-switch much of the energy is stored in the Yb ions rather than Er ions. 3) With pump lasers at approximately 980 nm, the radiationless transition involved in the population of Erbium's upper lasing state (for 1.5 micron lasing) generates additional waste heat and renders the photon quantum efficiency near 63%; the latter limiting efficiency and the former tending to destabilize the laser resonator.

Recently, the advantages of resonantly pumping bulk crystals free of sensitizing dopants have been demonstrated at eyesafe wavelengths in actively Q-switched lasers. Resonant pumping enjoys several well-documented advantages as compared to the non-resonant pumping process used in sensitized Er:glass lasers. Higher efficiency and less waste heat follow from the greatly improved quantum efficiency. With no sensitizer present, all stored energy resides in inverted Er ions, and so more is available for extraction. Lastly no radiationless transition, with its parasitic waste heat, is necessary.

Due to the cavity dimensions associated with them, these resonantly pumped actively Q-switched Erbium lasers will struggle to produce pulse widths substantially less than 20 ns and still have peak powers greater than 1 kW. Hence, for example, they will remain inefficient in applications such as scanning LADAR, wherein resolution requirements prefer less than 3 ns pulse widths for efficient operation.

Conventionally, passively Q-switched eyesafe lasers have been non-resonantly-pumped, sensitizer-doped Er:glass lasers (bulk or fiber) operating near 1.5 microns. These typically produce pulse widths on the order of a few ns and peak powers up to ~2 kW when operating at repetition rates near 1 kHz and up to tens of kW when operated near 10 Hz. Still many applications such as Scanning LADAR require tens of kW of peak power at 5 kHz and higher repetition rates. With its aforementioned inherent limitations of quantum defect, waste heat and energy storage bottleneck issues discussed above, sensitizer doped Er:glass passively Q-switch lasers have difficulty achieving these results.

Thus, a heretofore unaddressed need exists in the industry to address the aforementioned deficiencies and inadequacies.

SUMMARY OF THE INVENTION

Embodiments of the present invention provide a system and method for making a passively Q-switched, resonantly pumped, Erbium-doped crystalline laser. Briefly described in architecture, one embodiment of the system, among others, can be implemented as follows. The laser includes a resonant cavity formed between a first mirror and a second mirror. An Erbium-doped crystal gain medium for producing laser gain is disposed within the resonant cavity. A saturable absorber is disposed within the resonant cavity. A pump source is positioned to energize the gain medium. The saturable absorber, the laser gain, and the second mirror are selected such that output pulses having a duration of less than 75 nanoseconds are generated by the laser.

In another aspect, the invention features a method of forming a passively Q-switched, resonantly pumped, Erbium-doped crystalline laser. The method includes the steps of: forming a resonant cavity between a first mirror and a second mirror; disposing an Erbium-doped crystal gain medium within the resonant cavity; disposing a saturable absorber within the resonant cavity; energizing the gain medium with a pump source; and firing output pulses having a duration of less than 75 nanoseconds.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE INVENTION

Figure 1:
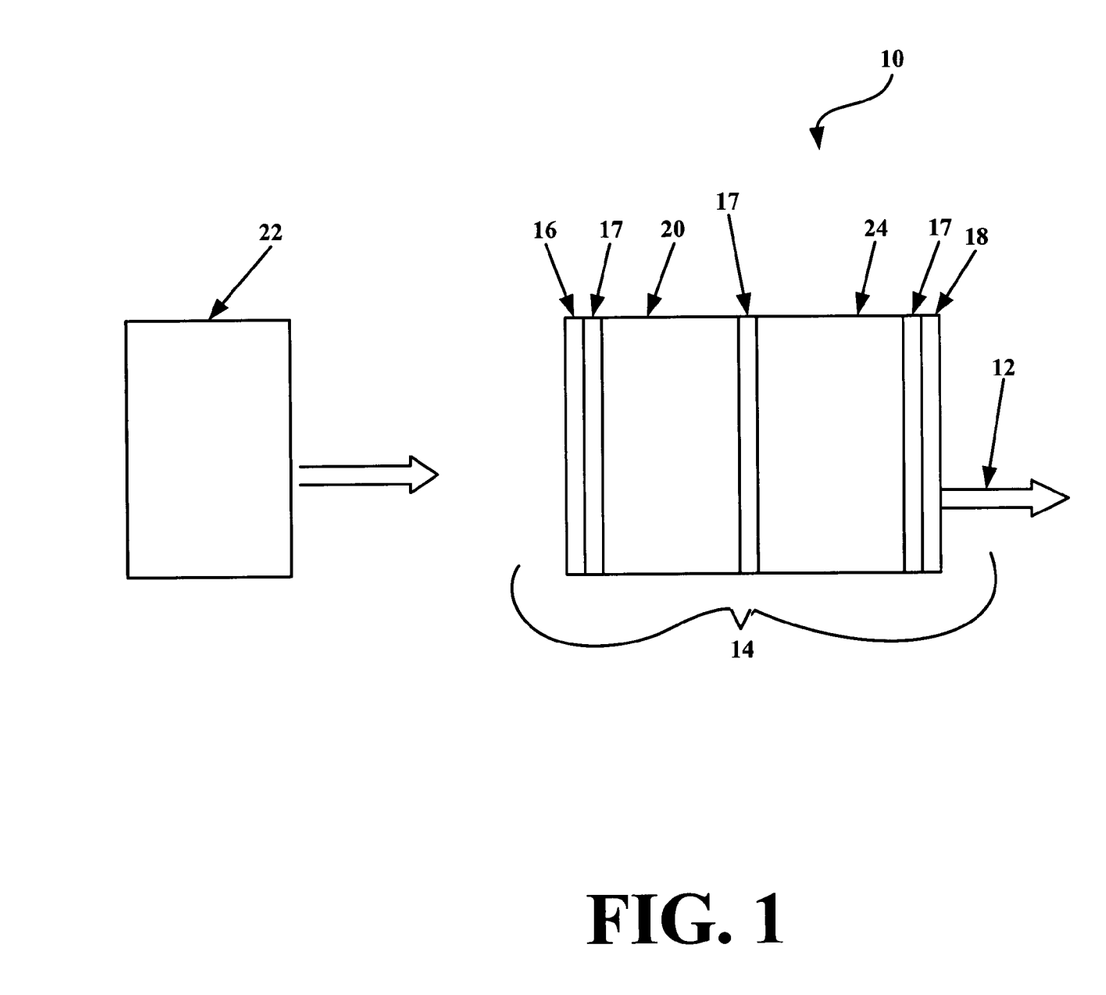
FIG. 1 is a cross-sectional view of a first exemplary embodiment of the invention.

FIG. 1 is a cross-sectional view of a laser 10 for producing output pulses 12, in accordance with a first exemplary embodiment of the invention. The laser 10 includes a resonant cavity 14 formed between a first mirror 16 and a second mirror 18. An unsensitized Erbium-doped crystal gain medium 20 is disposed within the resonant cavity 14 for producing laser gain. A saturable absorber 24 is disposed within the resonant cavity 14. A face cooling end cap 17 may be placed in contact with, or be an integral part of (e.g. undoped region), either the gain medium 20, or the saturable absorber 24, or both. A pump source 22 is positioned to energize the gain medium 20. The saturable absorber 24, the laser gain 20, the resonator length, and the second mirror 18 are selected so that output pulses 12 each have a duration of less than 75 ns, thereby generating short, high-peak power pulses.

The pump source 22 may be a diode laser, a fiber laser, solid state laser, or another pump source known to those having ordinary skill in the art to provide pump lighting to the laser 10. The pump source 22 may operate in the wavelength range of 1.4 to 1.7 microns. The laser 10 of FIG. 1 contains an end pumping pump source 22. However, the pump source 22 may be used to side pump the gain element (discussed herein in relation to a second exemplary embodiment). Alternatively, a laser may feature dual end pumping or both end pumping and side pumping. If the pump source 22 is used for end pumping, a dichroic optic may serve as the input coupler and as the high reflector (first mirror 16). The input coupler and/or high reflector 16 may be one or more separate optical elements or may be embodied by a coating placed upon the gain medium 20 or upon a face cooling end cap 17. Also, the input coupler may be a coating placed on the high reflector 16 or the high reflector 16 may be a coating placed upon the input coupler. Regardless of whether the pump source 22 is used for side pumping or end pumping, the pump lighting may be single passed or double passed. Techniques for both end pumping and side pumping are known to those having ordinary skill in the art.

The gain medium 20 may contain an Erbium-doped bulk crystal (including, but not limited to, yttrium aluminum garnet (YAG), yttrium ortho aluminate (YALO), lutetium aluminum garnet (LuAG), and yttrium scandium gallium garnet (YSGG)). The gain medium 20 may not require a sensitizing co-dopant. The concentration of Erbium in the gain medium 20 may be between 0.1 and 2.0 atomic percentage. In addition, the gain medium 20 may be axially less than one centimeter long. The gain medium may be single-crystal or poly-crystalline (ceramic) in nature.

The saturable absorber 24 is used to provide the laser 10 with Q-switching capability. The saturable absorber 24 prevents the onset of lasing until a calculable amount of laser energy, received from the gain medium 20, has been stored. The onset of lasing produces a high optical field within the cavity 14, which quickly saturates a saturable component of loss, increasing a cavity Q and resulting in a Q-switched output pulse 12. The saturable absorber 24 may be axially less than one millimeter long, which may be desirable in microlaser applications.

The saturable absorber 24 host material may be, but is not limited to, for example, a ZnTe, LMA, MALO, ASL, ZnSe, ZnS, YAG, or YSGG crystal doped with a dopant such as: $Cr^{2+}$; $Ni^{2+}$; and $Co^{2+}$. Alternatively, the saturable absorber crystal may also be YALO, YAG, or LuAG doped with $V^{3+}$ or might also be $Ca_5(PO_4)^3F$, $CaF^2$, or borosilicophosphate glasses, doped with $Er^{3+}$. Also, the saturable absorber may be a semiconductor saturable absorber mirror (SESAM) or a saturable absorber incorporating nano-tube technology. Other host materials for the saturable absorber 24 may become apparent based on the characteristics of the saturable absorber 24 herein described.

The resonant cavity 14 may be quasi-monolithic, as shown in FIG. 1, such that the gain medium 20, saturable absorber 24, face cooling end caps 17, and any additional materials within the resonant cavity 14 are one solid block. If the resonant cavity 14 is quasi-monolithic, an overall size of the laser 10 may be smaller. The resonant cavity 14 may also be designed to contain air gaps between these elements, as is further discussed herein. Also, the resonant cavity 14 may be designed to be monolithic, such that the gain medium 20 and the saturable absorber 24 are separate sections of the same crystalline object, as is further discussed herein. The first 16 and second mirrors 18 may be flat or may possess curvature (negative or positive).

The saturable absorber 24, the gain medium 20, the resonator length, and the second mirror 18 are selected with properties such that each output pulse 12 has a duration less than 75 nanoseconds. The saturable absorber 24, the laser gain 20, the resonator length, and the second mirror 18 may be selected so that each output pulse 12 has a duration of less than 20 nanoseconds. The saturable absorber 24, the laser gain 20, the resonator length, and the second mirror 18 may be selected so that each output pulse 12 has a duration of less than 10 nanoseconds. The saturable absorber 24, the laser gain 20, the resonator length, and the second mirror 18 may be selected so that each output pulse 12 has a duration of less than 5 nanoseconds. The saturable absorber 24, the laser gain 20, the resonator length, and the second mirror 18 may be selected so that each output pulse 12 has a duration of less than 1 nanosecond. The saturable absorber 24, the laser gain 20, the resonator length, and the second mirror 18 may be selected so that output pulses 12 have a wavelength of at least about 1.6 microns. The saturable absorber 24, the laser gain 20, and the second mirror 18 may be selected so that output pulses 12 have a wavelength of between about 1.5 microns and about 1.70 microns.

Figure 2:
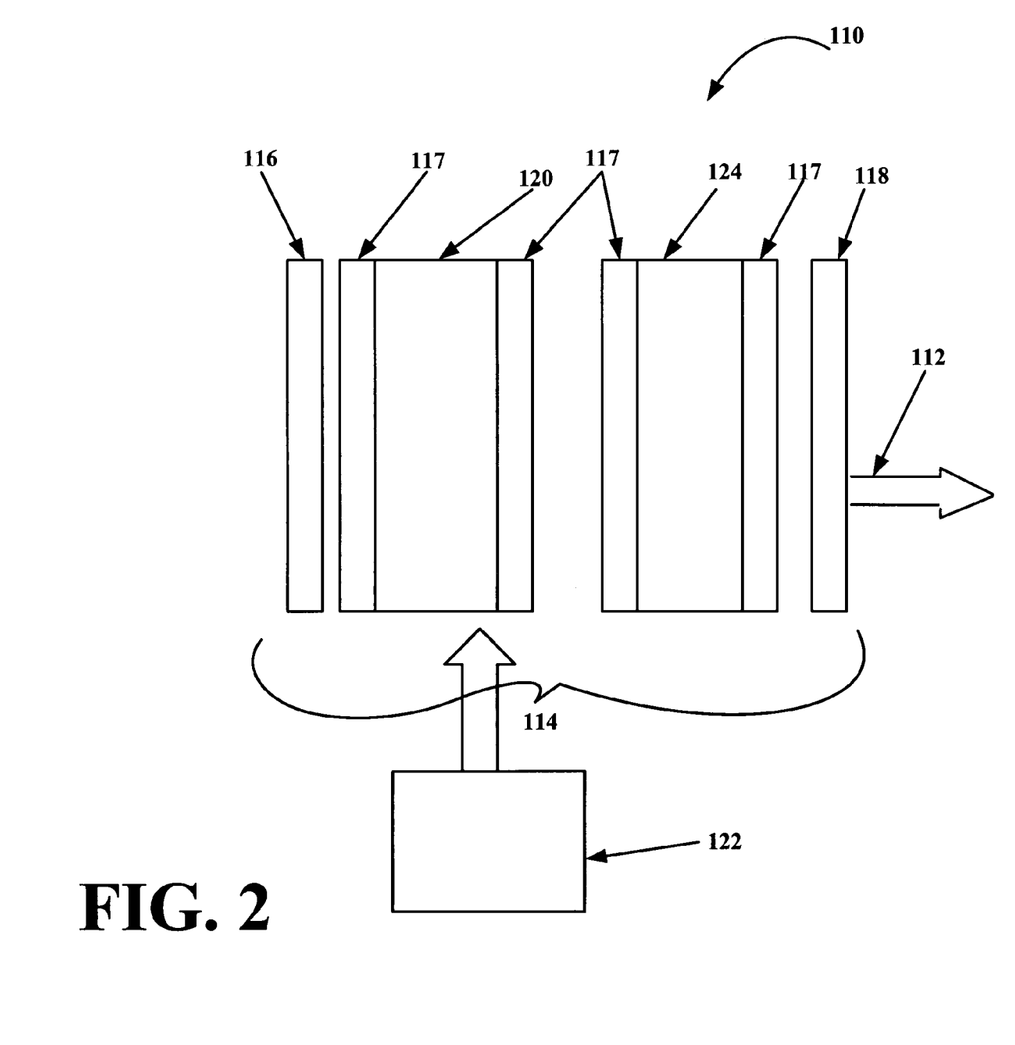
FIG. 2 is a cross-sectional view of a second exemplary embodiment of the invention.

FIG. 2 is a cross-sectional view of a laser 110 for producing output pulses 112, in accordance with a second exemplary embodiment of the invention. The laser 110 includes a resonant cavity 114 formed between a first mirror 116 and a second mirror 118. An unsensitized Erbium-doped crystal gain medium 120 is disposed within the resonant cavity 114 for producing laser gain. A saturable absorber 124 is disposed within the resonant cavity 114. A face cooling end cap 117 may be placed in contact with, or be an integral part of (e.g. undoped region), either the gain medium 120, or the saturable absorber 124, or both. A pump source 122 is positioned to energize the gain medium 120. The saturable absorber 124, the laser gain 120, the resonator length, and the second mirror 118 are selected so that output pulses 112 each have a duration of less than 75 nanoseconds.

As shown in FIG. 2, the pump source 122 may be used to side pump the laser 110. Pump light from the pump source 122 may be single passed or double passed through the gain medium 120, although the pump light is shown only single passed in FIG. 2. Air gaps 128 are shown in FIG. 2 between the gain medium 120 and the saturable absorber 124. The laser 110 shown in FIG. 2 could be designed to be quasi-monolithic simply by removing the air gaps 128.

Figure 3:
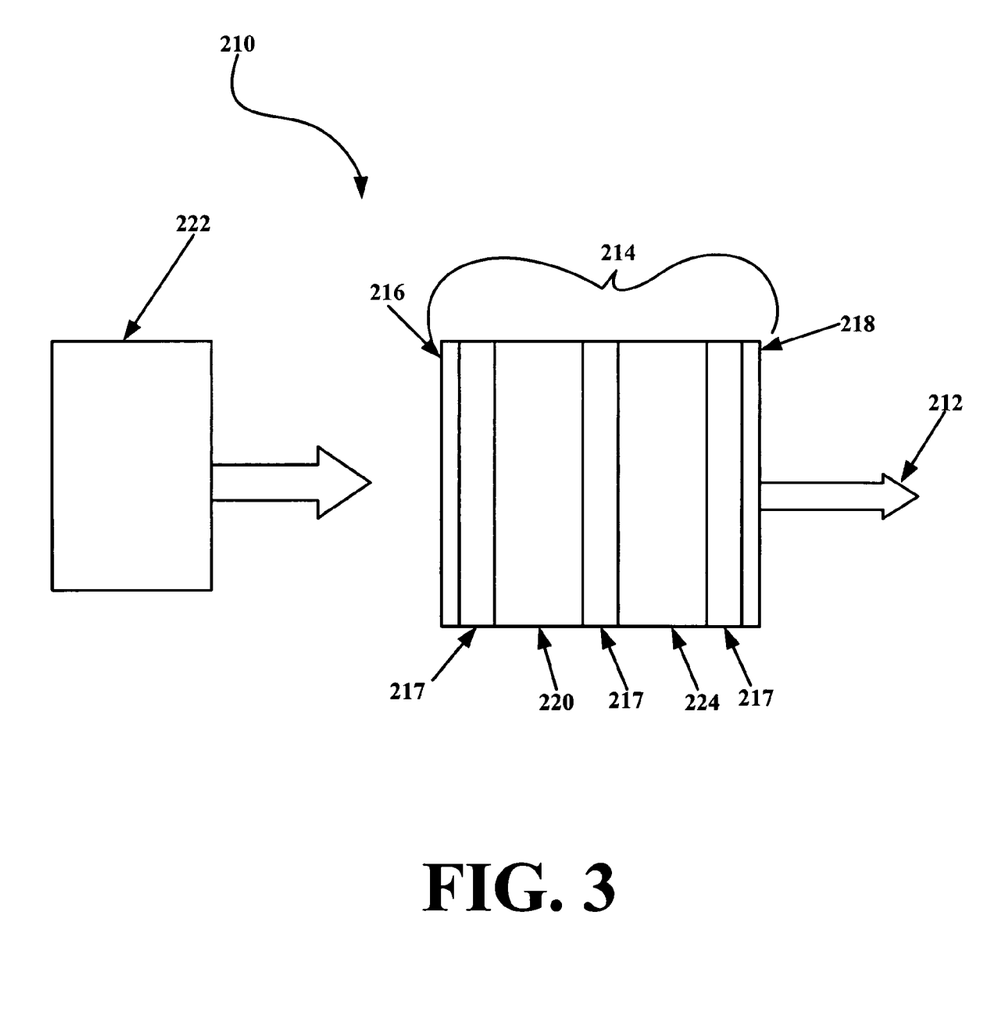
FIG. 3 is a cross-sectional view of a third exemplary embodiment of the invention.

FIG. 3 is a cross-sectional view of a laser 210 for producing laser output pulses 212, in accordance with a third exemplary embodiment of the invention. The third exemplary embodiment of the invention includes a true monolithic arrangement for the laser 210. The laser 210 includes a resonant cavity 214 formed between a first mirror 216 and a second mirror 218. An unsensitized Erbium-doped crystal gain medium 220 is disposed within the resonant cavity 214 for producing laser gain. A saturable absorber 224 is disposed within the resonant cavity 214. A pump source 222 is positioned to energize the gain medium 320. The saturable absorber 224, the laser gain 220, the resonator length, and the second mirror 218 are selected so that output pulses 212 each have a duration of less than 75 nanoseconds.

In the third exemplary embodiment shown in FIG. 3, a true monolithic arrangement, the resonant cavity 214 contains a single crystal. That single crystal, which could be, for example, YAG, contains the end cap 217, gain medium 220, and saturable absorber 224 regions of the laser 210. Moving from left to right on the resonant cavity 214 of FIG. 3, the single crystal contains an undoped region (end cap 217), an Er-doped region (gain medium 220), an undoped region (end cap 217), a Vanadium (V)-doped region (saturable absorber 224), and another undoped region (end cap 217). Performance of the monolithic arrangement does not differ significantly from the previously described embodiments, although preparation of the laser 210 may be more difficult (particularly in identifying crystals that can satisfy the needs of both the gain medium 220 and the saturable absorber 224) and the resulting laser 210 may be capable of being more compact.

Figure 4:
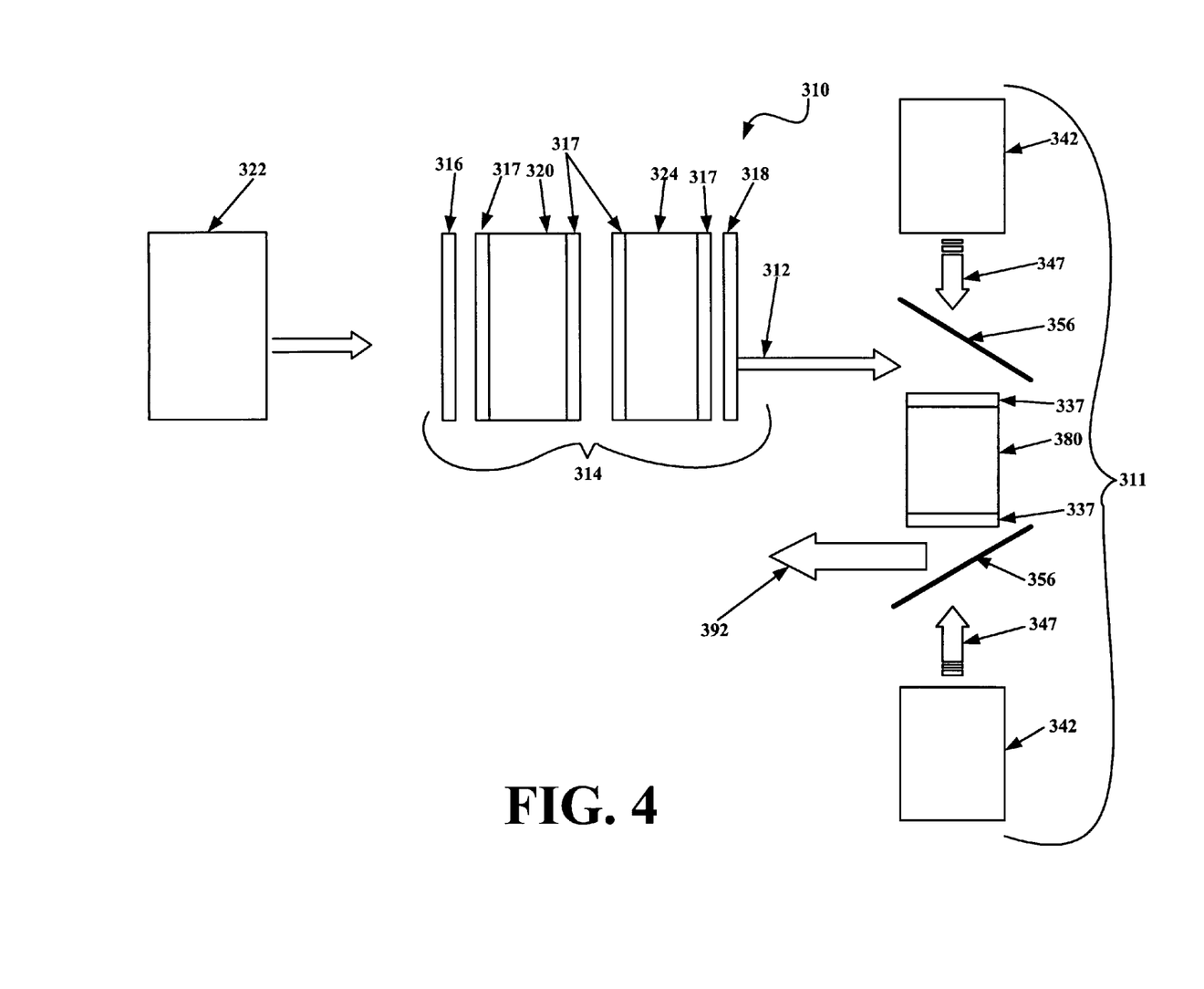
FIG. 4 is a cross sectional view of a fourth exemplary embodiment of the invention.

FIG. 4 is a cross-sectional view of a laser 310 for producing laser output pulses 312, in accordance with a fourth exemplary embodiment of the invention. The laser 310 includes a resonant cavity 314 formed between a first mirror 316 and a second mirror 318. An unsensitized Erbium-doped crystal gain medium 320 is disposed within the resonant cavity 314 for producing laser gain. A saturable absorber 324 is disposed within the resonant cavity 314. A face cooling end cap 317 may be placed in contact with, or be an integral part of (e.g. undoped region), either the gain medium 320, or the saturable absorber 324, or both. A pump source 322 is positioned to energize the gain medium 320. The saturable absorber 324, the laser gain 320, the resonator length, and the second mirror 318 are selected so that output pulses 312 each have a duration of less than 75 nanoseconds.

This fourth exemplary embodiment of the invention includes the laser 310 and one type of optical amplifier 311 which may be used to increase final energy of the laser output pulses 312. In this embodiment, the optical amplifier 311 includes two amplifier pump sources 342, each providing amplifier pump light 347. The amplifier couplers 356 operate to combine the pump light 347 and the laser output pulses 312 at the amplifier gain medium 380, to create an amplified output pulse 392.

The optical amplifier 311 illustrated in FIG. 4 is shown to be dual end pumped, but single end pumping or side pumping (double or single passed) methods, or other pumping methods known to those having ordinary skill in the art may be implemented.

In the case that a bulk optical element serves as the amplifier gain medium 380, it may have face cooling end caps 337, wherein there resides no atoms, ions, or molecules which absorb the pump light 347 or the laser output pulses 312.

The optical amplifier 311 may also be guided-wave in nature (such as but not limited to a fiber or planar arrangement) and the couplers 356 may also be guided-wave in nature, such as but not limited to one or more of the various fiber couplers known to those having ordinary skill in the art.

Regardless of architecture (bulk/free-space or guided-wave) the pump sources 342 may be a fiber laser, diode laser, solid-state laser, gas laser or other kind of laser with appropriate wavelength output for energizing the amplifier gain medium 380. The pump sources 342 may be used to single end pump, side pump, or dual end pump the amplifier gain medium 380. Other means optical or electrical, known to those having ordinary skill in the art might also be used to provide the energy needed to induce net gain for the signal optical pulses to be amplified.

Whether bulk/free-space or guided-wave, the couplers 356 may involve polarization-based techniques, dichroic (wavelength combining) techniques, geometrical techniques, or other signal and pump combining techniques known to those having ordinary skill in the art.

While a passively Q-switched resonantly pumped Erbium (PQRPE) laser can serve to reduce the complexity of an actively Q-switched resonantly pumped erbium (RPE) laser, regardless of pulse width, one advantage of a PQRPE is that it can achieve short pulse widths that would be very difficult to obtain with an actively Q-switched RPE.

When designing a PQRPE for <20 ns pulse generation, several tradeoffs are encountered. Low Er concentration (<1 atomic percent) must be utilized in order to keep upconversion from becoming problematic. However, because the threshold for an end pumped quasi-three level laser is proportional to $1/\eta_a$, where $\eta_a$ is the fraction of absorbed pump light, a low Er concentration crystal must be sufficiently long, so that, for a certain amount of available pump power, desirable lasing power may be achieved. Lengthening the Er gain crystal however increases the cavity length of the resonator, thus increasing the pulse width, which for short pulse generation is undesirable. Hence a balance in parameters should be carefully chosen. Aiding this trade off is the arrangement of double pass pumping, wherein by reflecting the pump light back through the gain crystal the effective absorption length is increased and threshold lowered, but resonator length unchanged.

Selection of the saturable absorber to serve as the passive Q-switch is not trivial, since most of the materials used to passively Q-switch Er:glass lasers do not have useful absorption cross section values, $\sigma_a$, and/or upper state lifetimes, $\tau_{sa}$, in the 1.6 to 1.65 micron wavelength region, wherein the majority of RPE lasers emit light. Furthermore, for short pulse designs, concentrations of the chosen saturable absorber must be carefully selected and fabricated such that the small signal transmission, $T_o$, is at the desired value, but the saturable absorber element kept thin enough to allow a short (<1 cm) oscillator cavity length. The relationship guiding these choices is $T_o = \exp(-n\sigma_a l)$, where n is the number density of the saturable absorber dopant, $\sigma_a$ its small signal absorption cross section, and l is the thickness of the SA element.

In conjunction, pump spot size and transmission of the output coupler are preferably methodically chosen according to available pump power in order for desired pulse widths, pulse repetition rates, and pulse energies to be achieved.

Figure 5:
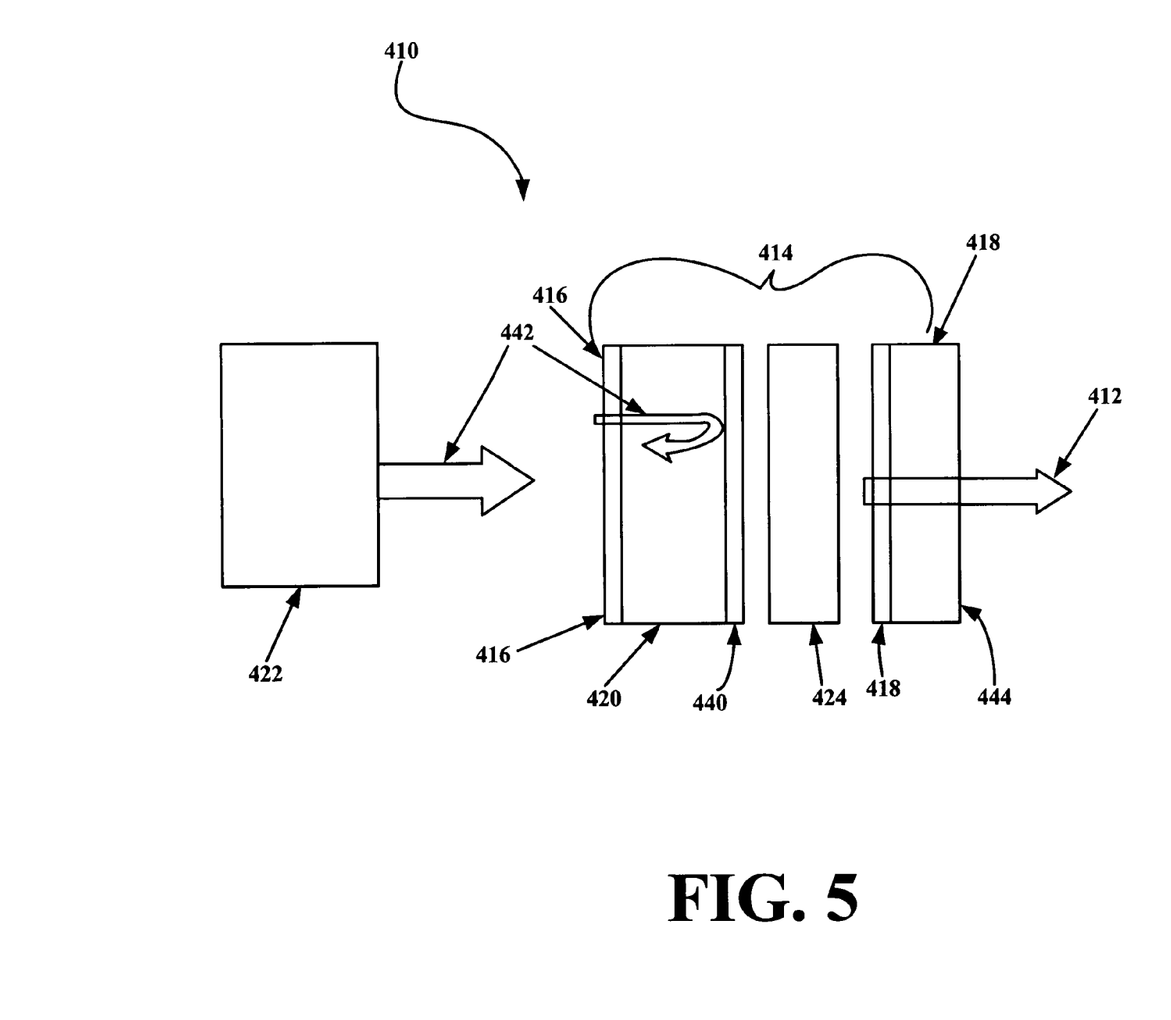
FIG. 5 is a cross sectional view of a fifth exemplary embodiment of the present invention.

By way of specific example, FIG. 5 is a cross sectional view of a fifth exemplary embodiment of the laser 410. The laser 410 includes a resonant cavity 414 between a first mirror 416 and a second mirror 418. The gain medium 420 for the laser 410 is a 7.5 mm, 0.5 atomic percentage, Erbium: Yttrium Aluminum Garnet crystal, double pass end pumped by a 10 W source 422 of nearly diffraction limited 1532 nm light, with an output coupling of 5%. Using well documented theory and choosing a pump spot diameter of 270 microns indicates one may expect a threshold of approximately 2 W, a slope efficiency of ~10%, and at 10 W of pump drive roughly 700 milliwatt of continuous wave (or average power) output. Such performance is far from the optimum one can achieve with a well-designed continuous wave RPE laser, but represents a reasonable starting point when a goal is to have a PQRPE generating <10 ns pulses.

The pump light 442 is double passed between the first mirror 416 and a double pump mirror 440. The double pump mirror 440 is designed to permit an optic signal at an output pulse 412 wavelength to pass through to the saturable absorber 424 while reflecting the optic signal of the pump light 442, which is 1532 nm in this example. Double passing the pump light 442 prevents the pump light 442 from passing through the saturable absorber 424, which some people having ordinary skill in the art believe diminishes the performance of the saturable absorber 424. The first mirror 416 will reflect optic signals at both the pump light 442 wavelength and at the output pulse 412 wavelength.

Calculations based upon passive Q-switching theory which includes the effects of excited state absorption in the saturable absorber predict that placing a 1 mm axially thick $Co^{2+}$:ZnSe saturable absorber 424 with $1.4e18$ $cm^{-3}$ particle concentration into the resonant cavity 414 such that the physical resonant cavity 414 length of the laser resonator is ~1 cm, will lead to pulsed operation of the RPE laser 410. These calculations estimate approximately 5 ns, 80 microjoules (μJ) output pulses 412 will be emitted from a bulk output coupler 444 at a wavelength between 1.615 and 1.65 microns at a pulse repetition frequency (PRF) around 4 kHz, providing a peak power between 15 and 20 kW.

By having a separate optic for the bulk output coupler 444, the output coupler can be optimally aligned for performance of the laser 410. Similar performance can be achieved without a bulk output coupler 444, but preparation of the laser 410 is more intensive (effort needs to be made to make optic elements parallel, which can be difficult in such a small laser 410). Therefore, in applications where space is available, use of a bulk output coupler 444 is desirable.

A method is provided for making a passively Q-switched, resonantly pumped, Erbium-doped crystalline laser 10. A resonant cavity 14 is formed between a first mirror 16 and a second mirror 18. An unsensitized Erbium-doped crystal gain medium 20 is disposed within the resonant cavity 14. A saturable absorber 24 is disposed within the resonant cavity 14. Energy is released from a pump source 22 toward the gain medium 20, the energy having a wavelength between about 1.4 and about 1.7 microns, thereby energizing the gain medium 20. Output pulses 12 are generated having a duration of less than 75 nanoseconds.

It should be emphasized that the above-described embodiments of the present invention are merely possible examples of implementations, simply set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

We claim:

1. A laser for producing output pulses, the laser comprising:
   a resonant cavity formed between a first minor and a second mirror;
   an unsensitized Erbium-doped crystalline gain medium disposed within the resonant cavity for producing laser gain;
   a saturable absorber disposed within the resonant cavity, wherein the saturable absorber, the gain medium, and the second mirror being selected and positioned such that output pulses having a duration of less than 75 nanoseconds are generated,
   a pump source capable of providing photons having a wavelength of approximately 1.4 to 1.7 microns, the pump source positioned to energize the gain medium.

2. The laser of claim 1 wherein the saturable absorber is a crystal having a dopant concentration and thickness such that the small signal transmission, $T_o$, at lasing wavelengths is between 0.2 and 0.99.

3. The laser of claim 1 wherein the output pulses have a wavelength approximately between 1.5 and 1.7 microns.

4. The laser of claim 1, farther comprising at least one end cap abutting a face of at least one element selected from the group consisting of the gain medium and the saturable absorber, thereby enabling face cooling of at least one element.

5. The laser of claim 1, further comprising an optical coating operable as at least one element selected from the group consisting of an input coupler, the first mirror, and the second mirror; at least partially coating at least one element selected from the group consisting of the gain medium, the saturable absorber, and at least one end cap.

6. The laser of claim 1 further comprising at least one airgap within the resonator cavity.

7. The laser of claim 1, further comprising an optical amplifier positioned to receive and amplify the output pulses.

8. The laser of claim 7 wherein an amplifier pump source within the optical amplifier is selected from a group consisting of a diode laser, a solid state laser, and a fiber laser.

9. The laser of claim 1 wherein at least one of the first mirror and the second mirror are curved.

10. The laser of claim 1 wherein the gain medium is selected from the group consisting of: YAG; YLF;YALO; LuAG; and YSGG.

11. The laser of claim 10 wherein the gain medium has an Erbium concentration of between about 0.1 and 2.0 atomic percentage.

12. The laser of claim 1 wherein the gain medium is poly-crystalline.

13. A method for forming a passively Q-switched laser comprising the steps of:
   forming a resonant cavity between a first mirror and a second mirror;
   disposing an unsensitized Erbium-doped crystal gain medium within the resonant cavity;
   disposing an appropriate saturable absorber within the resonant cavity; and
   releasing energy from a pump source toward the gain medium, the energy having a wavelength between about 1.4 and about 1.7 microns, thereby energizing the gain medium;
   generating output pulses having a duration of less than 75 nanoseconds.

14. The method of claim 13 further comprising generating output pulses having a wavelength between about 1.5 and about 1.7 microns.

15. The method of claim 13 wherein the step of releasing energy further comprises side pumping the gain medium with a pump source selected from a group consisting of a diode laser, solid state laser, and fiber laser.

16. The method of claim 13 wherein the step of releasing energy further comprises end pumping the gain medium wit a pump source selected from a group consisting of a diode laser, solid state laser, and or fiber laser.

17. The method of claim 13 wherein dichroic means, polarization means, or geometrical means are used to couple the pump light to the gain medium.

* * * * *

UNITED STATES PATENT AND TRADEMARK OFFICE
CERTIFICATE OF CORRECTION

| | | |
|---|---|---|
| PATENT NO. | : 7,203,209 B2 | Page 1 of 1 |
| APPLICATION NO. | : 11/040758 | |
| DATED | : April 10, 2007 | |
| INVENTOR(S) | : Young et al. | |

It is certified that error appears in the above-identified patent and that said Letters Patent is hereby corrected as shown below:

Column 7, Line 58, Claim 1, "minor" should be --mirror--.
Column 8, Line 10, Claim 4, "farther" should be --further--.
Column 8, Line 16, Claim 16, "wit" should be --with--.

Signed and Sealed this

Fourteenth Day of August, 2007

JON W. DUDAS
*Director of the United States Patent and Trademark Office*